United States Patent [19]

Larsen et al.

[11] Patent Number: 5,959,657
[45] Date of Patent: Sep. 28, 1999

[54] METHOD AND APPARATUS FOR SHIELDING LIGHT IN AN INTERNAL DRUM IMAGING SYSTEM

[75] Inventors: David B. Larsen, Woburn, Mass.; Robert Zawojski, Derry, N.H.

[73] Assignee: Agfa Corporation, Wilmington, Mass.

[21] Appl. No.: 08/990,648

[22] Filed: Dec. 15, 1997

[51] Int. Cl.[6] .................................................. B41J 2/47
[52] U.S. Cl. .................... 347/262; 347/264; 347/139; 359/612; 359/234; 359/236
[58] Field of Search ..................................... 347/130, 263, 347/262, 264, 139; 359/608, 612, 613, 614, 227, 230, 234, 235, 236

[56] References Cited

U.S. PATENT DOCUMENTS 5,192,973   3/1993   Hickisch .................................. 347/130

Primary Examiner—N. Le
Assistant Examiner—Hai C. Pham
Attorney, Agent, or Firm—John A. Merecki

[57] ABSTRACT

A collapsible shield for shielding the imaging beam of an internal drum imaging system. The collapsible shield is configured to be positioned in an extended position to enclose the imaging beam during scanning of an imaging material, and positioned in a retracted position during loading of the imaging material into the imaging system.

30 Claims, 6 Drawing Sheets

METHOD AND APPARATUS FOR SHIELDING LIGHT IN AN INTERNAL DRUM IMAGING SYSTEM

FIELD OF THE INVENTION

The present invention is in the field of imaging systems. More particularly, the present invention provides a method and apparatus for shielding an imaging beam as it travels between the optical carriage and the writing surface of an internal drum imaging system.

BACKGROUND OF THE INVENTION

To ensure quality and accuracy during imaging in an internal drum imaging system, such as an imagesetter, platesetter, or the like, the imaging beam is often shielded as it passes between the optical carriage and the imaging surface. In the past, this has been accomplished in a number of ways. For example, as disclosed in U.S. Pat. No. 5,589,973, assigned to the Agfa Division of Bayer Corporation, incorporated herein by reference, a radial shield pair, or "clam shell," is used to shield the imaging beam. The imaging beam is protected between the two halves of the shell from thermal currents and various other conditions which could cause deleterious beam deflections. The shell also serves to contain the imaging beam to prevent stray reflections which could cause unwanted exposure of the imaging material.

This type of shield is typically produced from materials such as aluminum, since it needs to be both rigid and lightweight. The rigidity is required so that a reasonably small gap can be maintained between the shells of the shield for passage of the beam without the shells moving into the beam path. The lightweight construction of the shield is required because the shield is generally attached to the optical carriage which traverses the drum axially while imaging. In general, adding mass to the carriage degrades its performance.

A further example of such a shield may be found in U.S. Pat. No. 5,671,005, assigned to the Agfa Division, Bayer Corporation, incorporated herein by reference.

In another configuration of an internal drum imaging system, an applicator assembly is used for moving imaging materials into the drum and/or "ironing" the imaging materials against the drum surface. In order to avoid interference between the shield and the applicator assembly, the optical carriage and attached shield must be moved axially outside the drum area serviced by the applicator assembly. Unfortunately, this decreases the throughput of the imaging system because additional time is required to move the optical carriage and attached shield out of the drum away from the applicator assembly during the loading of imaging material, and to return the optical carriage and attached shield to an imaging position within the drum. Additionally, the size of the drum and/or housing of the imaging system must be considerably larger to accommodate the extra travel distance of the optical carriage, thereby increasing the overall size and weight of the imaging system.

SUMMARY OF THE INVENTION

The present invention provides an apparatus for shielding the imaging beam of an internal drum imaging system while avoiding the disadvantages of prior art shields.

Generally, the present invention provides a collapsible shield configured to be positioned in an extended position to enclose the imaging beam during scanning of an imaging material, and positioned in a retracted position during loading of the imaging material into the imaging system.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
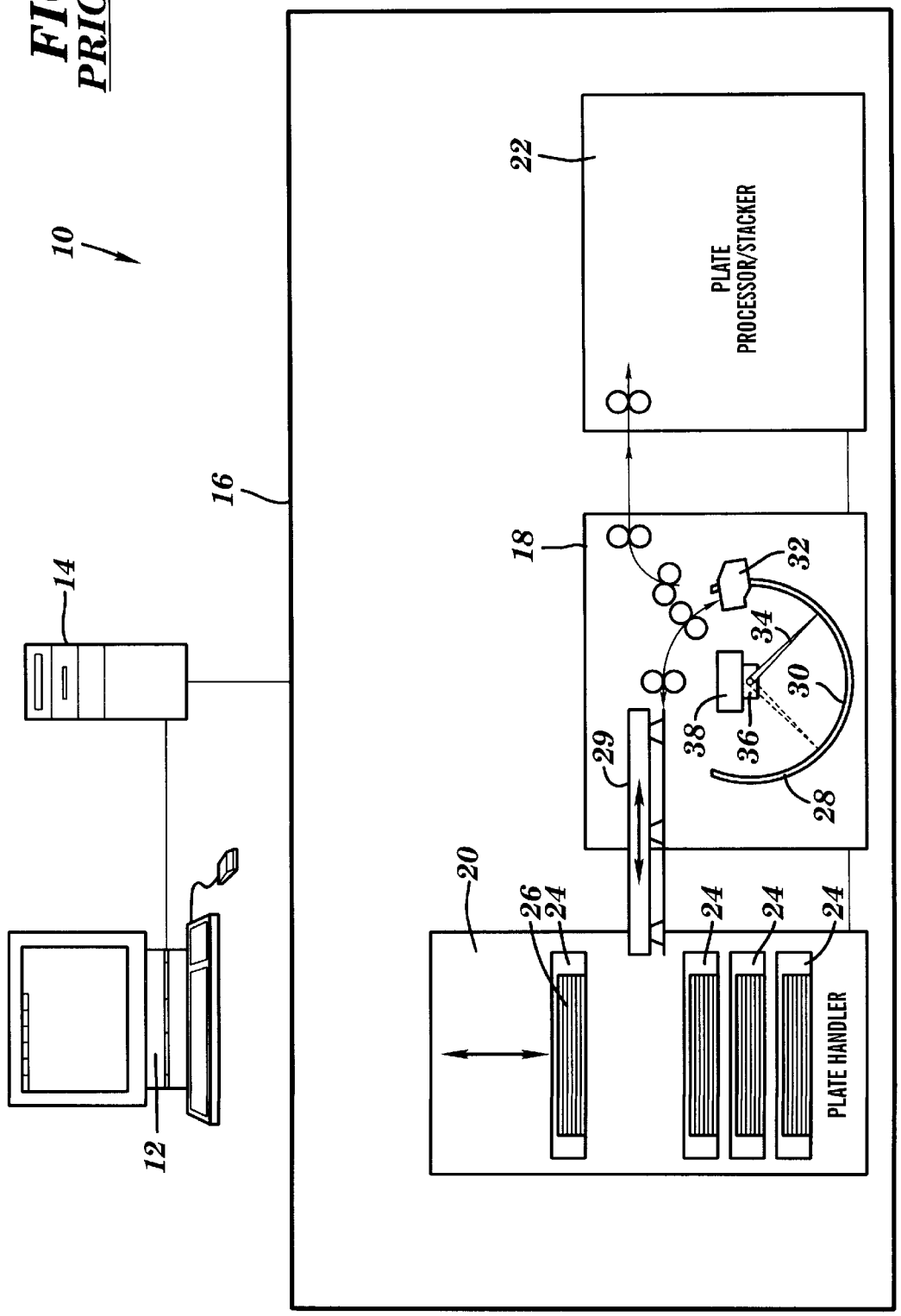
FIG. 1 illustrates an example of a prior art imaging system.

The objects, features, and advantages of the present invention are illustrated in detail in the accompanying drawings, wherein like reference numerals refer to like elements throughout the drawings.

An example of an internal drum imaging system, generally designated as 10, is illustrated in FIG. 1. In this example, the imaging system 10 is a computer to plate imaging system, commonly referred to as a platesetter, wherein digital data is imaged directly onto a printing plate. Of course, the collapsible shield of the present invention may also be used in other types of internal drum imaging systems, including imagesetters, digital proofers, and the like, without departing from the intended scope of the present invention.

The imaging system 10 generally includes a front end server or computer 12, a raster image processor (RIP) 14 and a platesetter 16. The platesetter 16 has three major components, including an internal drum imaging engine 18, an on-line plate handler 20, and an on-line plate processor/stacker 22.

The plate handler 20 includes at least one cassette 24 containing a supply of printing plates 26 which are generally formed from aluminum, polyester, or other suitable materials. A plate shuttle mechanism or "picker" 29 removes a single plate 26 from one of the cassettes 24 and transports the plate 26 to the imaging engine 18.

The imaging engine 18 includes an internal drum 28 having a cylindrical imaging surface 30 for supporting a plate 26 during imaging. An applicator assembly 32 is used to position and iron the plate 26 against the imaging surface 30 of the internal drum 28. Once properly positioned by the applicator assembly 32 against the imaging surface 30, the plate 26 is exposed by an imaging beam 34 radiating from a scanning system 36 carried by a movable optical carriage 38. Such a scanning/carriage arrangement is disclosed, for example, in U.S. Pat. No. 5,598,739, assigned to the Agfa Division of Bayer Corporation, incorporated herein by reference.

Figure 2:
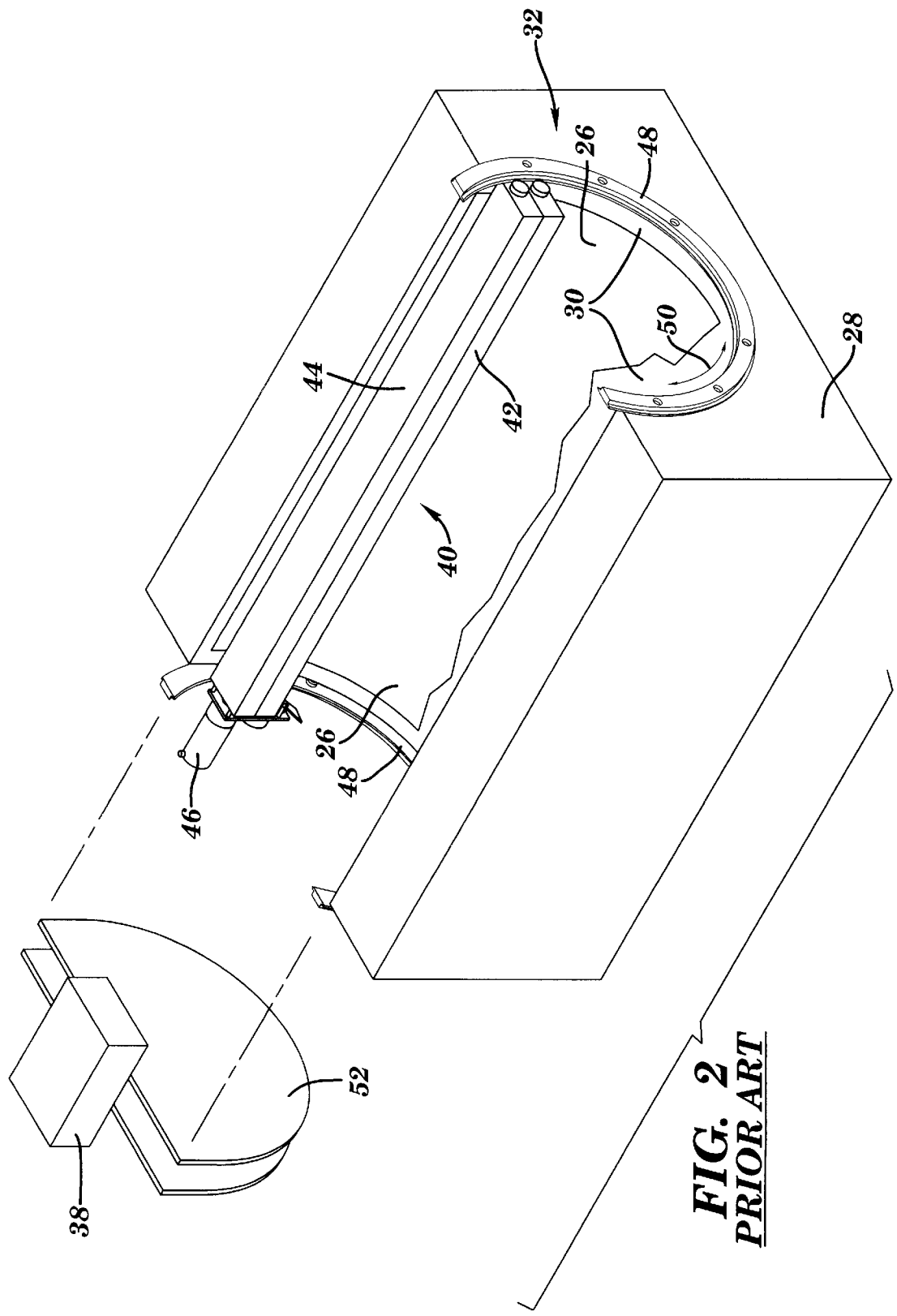
FIG. 2 illustrates an applicator assembly positioned within the drum of an internal drum imaging system.

The applicator assembly 32 is illustrated in greater detail in FIG. 2. The applicator assembly 32 generally includes a carriage 40 supporting a plate gripping module 42 for holding a plate 26 as it is pulled into the drum (e.g., using a plurality of pneumatically controlled suction cups), and a roller module 44 for ironing the plate against the imaging surface 30 of the internal drum 28. A self-propelled drive system 46 is provided for displacing the applicator assembly 32 about the drum 28 along tracks 48 as indicated by directional arrow 50.

After a plate 26 is delivered to the imaging engine 18 by the picker 29 (FIG. 1), it is positioned in a manner known in the art on the imaging surface 30 of the internal drum 28 by the applicator assembly 32. Typically, a first end of the plate is gripped by the plate gripping module 42 of the applicator assembly 32. The applicator carriage 40 is displaced by the drive system 46 to the opposing side of the internal drum 28, thereby pulling the plate 26 across the imaging surface 30. Once suitably positioned for imaging, the plate 26 is ironed against the imaging surface 30 of the internal drum 28 by the roller module 44 of the applicator assembly, as the applicator carriage 40 is displaced back towards its home position by the drive system 46. At this point, the plate 26 is ready to be imaged by the scanning system 36.

Figure 3:
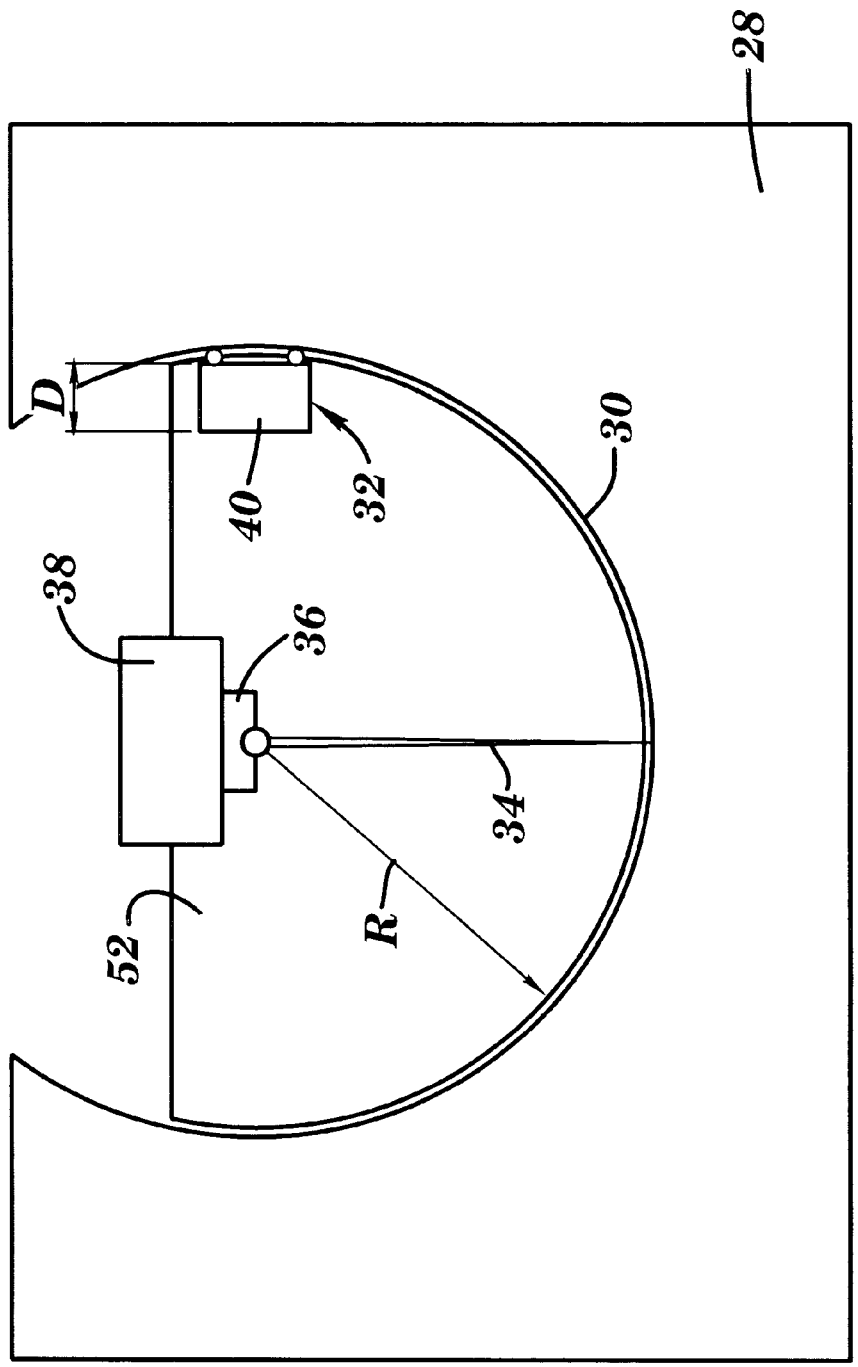
FIG. 3 illustrates the operational interference between the applicator assembly of FIG. 2 and a prior art shield.

The problems discussed above with regard to the use of a prior art type shield 52 are illustrated in FIGS. 2 and 3. Specifically, referring first to FIG. 3, there is illustrated the interference D that exists when using a rigid, prior art shield 52 in an imaging system having an applicator assembly 32. Although the interference D could be removed by shortening the radius R of the shield 52 such that the end of the shield 52 clears the carriage 40 of the applicator assembly 32, such shortening would substantially reduce the effectiveness of the shield 52. As a result, the optical carriage 38 and attached shield 52 are generally displaced axially outside the drum area serviced by the applicator assembly 32 during the loading of imaging material onto the imaging surface 30 of the drum 28. The resultant positioning of the optical carriage 38 and attached shield 52 is shown in phantom in FIG. 2.

Figure 4A:
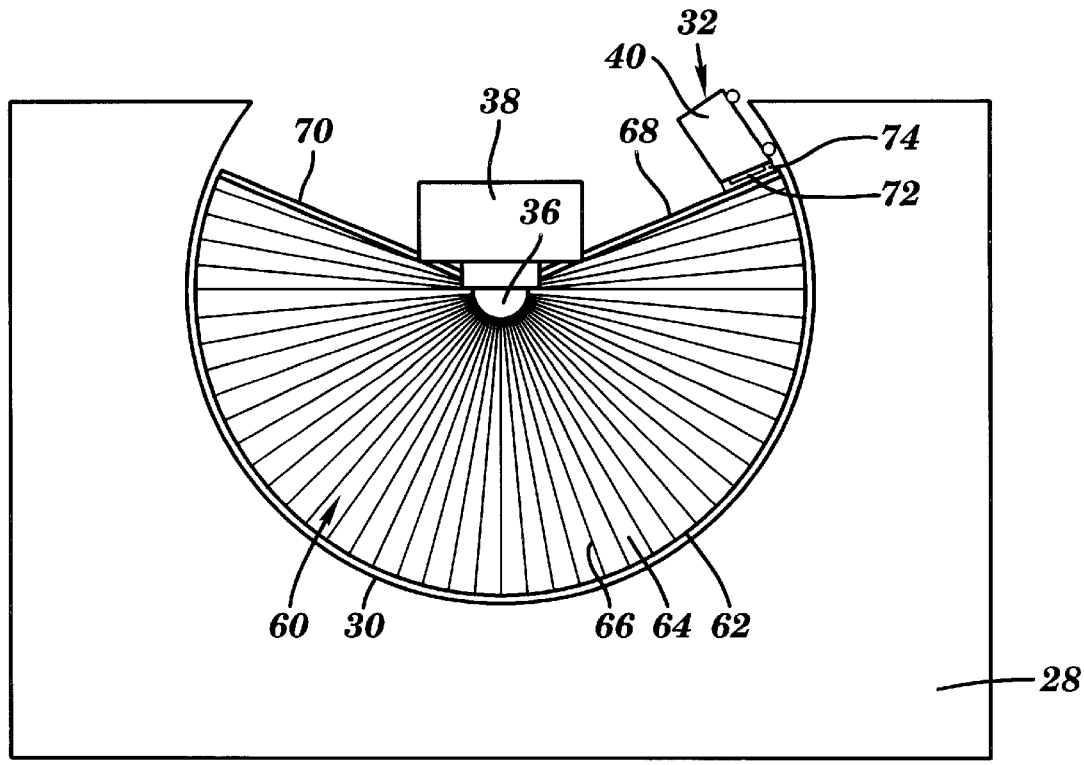
FIG. 4A is a view of a collapsible shield in accordance with a preferred embodiment of the present invention, wherein the collapsible shield is in an extended position.
Figure 4B:
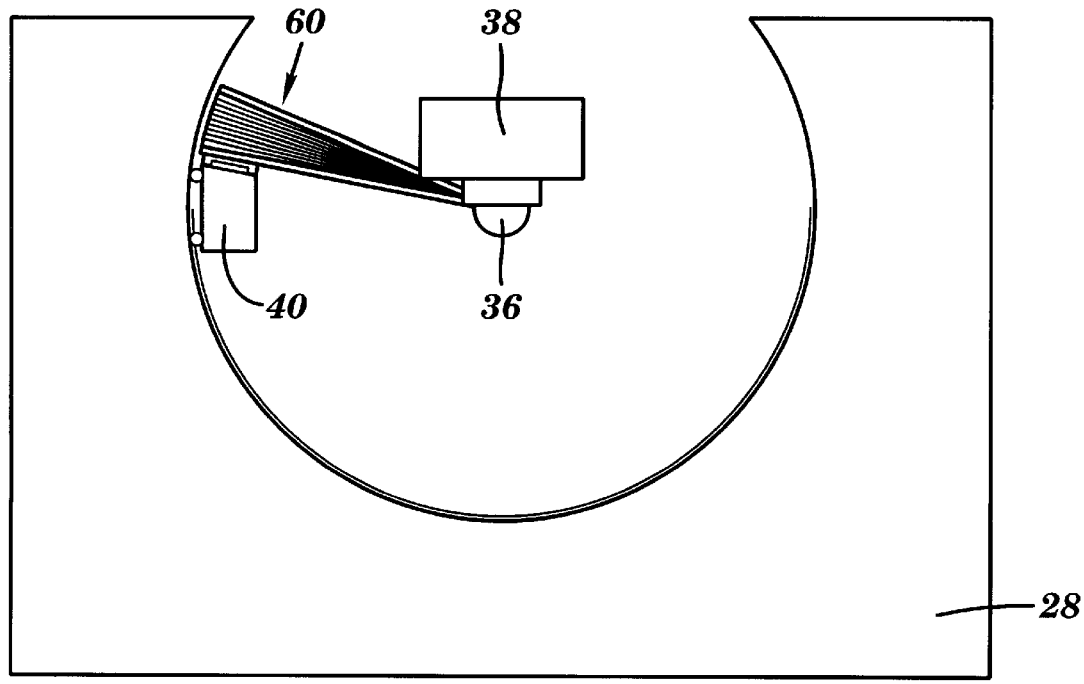
FIG. 4B is a view of the collapsible shield of FIG. 4A in its retracted position.

The present invention obviates the disadvantages associated with prior art shields by using a collapsible shield 60 which remains in the drum during the operation of the applicator assembly 32. The operation of the collapsible shield 60 is illustrated in FIGS. 4A and 4B.

In accordance with a preferred embodiment of the present invention, the collapsible shield 60 is generally provided with a pair of fan-like members 62, each including a plurality of side panels 64 separated by supports 66. The fan-like members 62 are joined together at first and second ends by rigid end supports 68, 70. The fan-like members 62 extend from the scanning system 36 toward the imaging surface 30 of the internal drum 28 on opposing sides of the imaging beam 34, thereby providing a protective light and air baffle. The fan-like members 62 are configured to extend and retract in a manner similar to that of a bellows, Japanese fan, or other similar structure, in response to a displacement of the applicator carriage 40 about the internal drum 28. Preferably, as shown in FIG. 4A, the collapsible shield 60 is in an extended state when the applicator carriage 40 is in its "home" position.

The first end support 68 of the collapsible shield 60 is coupled to the applicator carriage 40 such that it can be displaced longitudinally, while the collapsible shield is extended, through the internal drum 28 during imaging. This may be accomplished using a guide rail 72 on the applicator carriage 40 and a complementary slide 74 coupled to the first end support 68, or similar type structure. The second end support 70 is fixedly secured to the scanning system 36 or optical carriage 38. This allows the collapsible shield 60 to be retracted and extended as the applicator carriage 40 is displaced away from or toward, respectfully, its home position.

Figure 5:
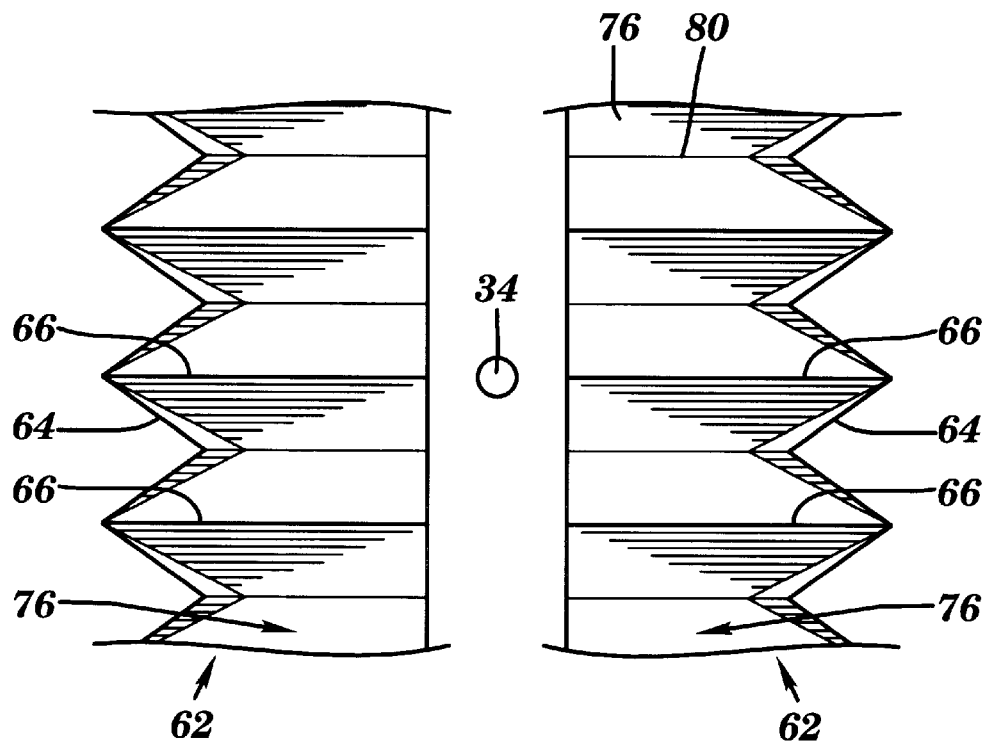
FIG. 5 is a bottom view of the collapsible shield in an extended position shielding an imaging beam.
Figure 7:
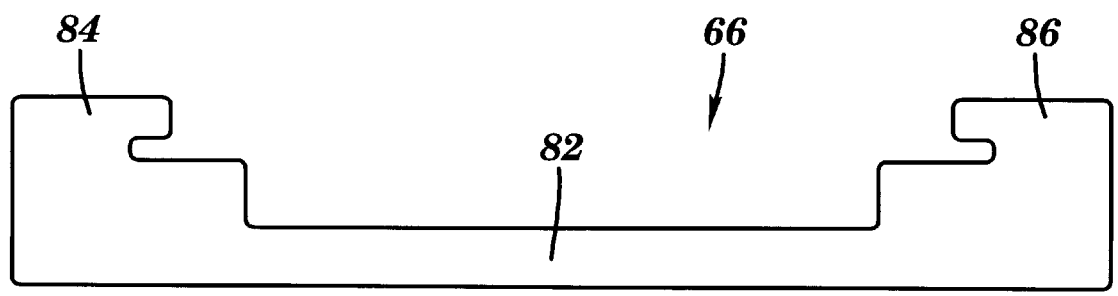
FIG. 7 illustrates one of the supports of the collapsible shield.
Figure 6:
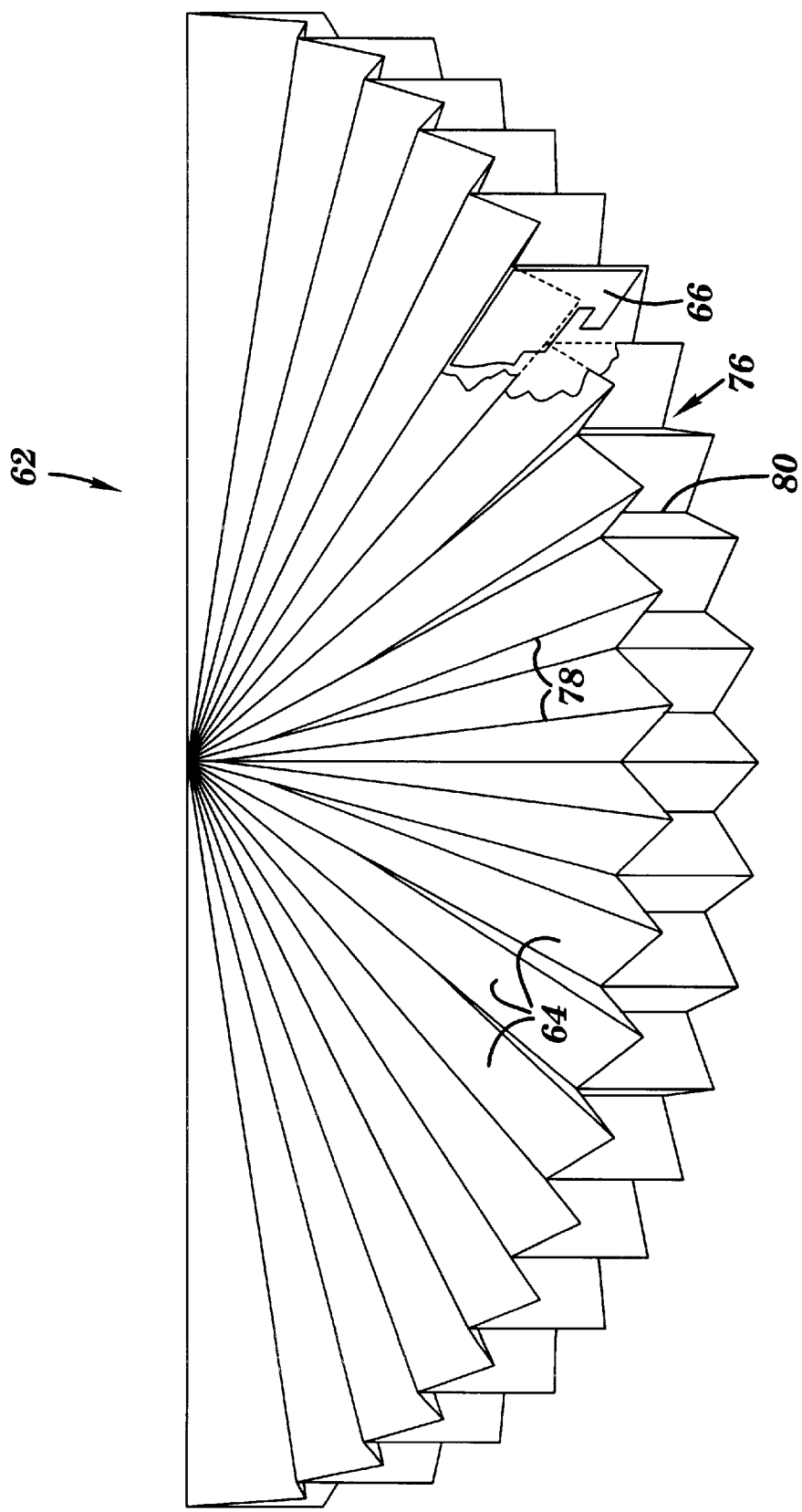
FIG. 6 is an partial view of the interior of the collapsible shield in an extended position.

The collapsible shield 60 is illustrated in greater detail in FIGS. 5–7.

FIG. 5 provides a bottom view of the collapsible shield 60 in an extended position shielding the imaging beam 34. As detailed above, the collapsible shield 60 includes a pair of fan-like members 62 positioned on opposing sides of the imaging beam 34. The fan-like members 62 are comprised of a plurality of side panels 64 separated by supports 66. Each side panel 64 has a two-piece pleated configuration which allows the side panel to be folded or unfolded during retraction and extension, respectfully, of the collapsible shield 60. A bottom panel 76 extends inwardly toward the imaging beam 34 from each side panel 64 between each pair of the supports 66.

FIG. 6 is an partial view of the interior of one of the fan-like members 62. As shown, each side panel 64 forms an inwardly-directed radial ridge 78 about which the two pieces of the side panel fold or unfold as the collapsible shield 60 is retracted or extended, respectively. The inwardly-directed bottom panel 76 also has a two-piece pleated configuration which is configured to fold or unfold about a ridge 80 as the collapsible shield 60 is retracted or extended, respectively. The side and bottom panels 64, 76, may be formed of any suitable material having sufficient light and air shielding characteristics.

One of the supports 66 is illustrated in greater detail in FIG. 7. The support 66 includes a radially extending center section 82 and first and second inwardly extending end sections 84, 86. This type of support 66 provides the fan-like members 62 of the collapsible shield 60 with sufficient rigidity to prevent the fan-like members 62 from moving into the imaging beam 34 when extended.

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention as defined by the accompanying claims.

We claim:

1. An imaging system, including:
    a system for scanning an imaging material with an imaging beam;
    a collapsible shield; and
    a system for selectively retracting and extending the collapsible shield;
    wherein said collapsible shield is in an extended position to enclose said imaging beam during scanning of said imaging material, and wherein said collapsible shield is in a retracted position during loading of said imaging material into said imaging system.

2. The imaging system according to claim 1, wherein said imaging system includes an internal drum having an imaging surface for supporting said imaging material during scanning.

3. The imaging system according to claim 2, wherein said collapsible shield remains within said internal drum during loading of said imaging material into said imaging system.

4. The imaging system according to claim 2, wherein said imaging system further includes an applicator assembly for loading said imaging material into the internal drum of said imaging system.

5. The imaging system according to claim 4, wherein said applicator assembly includes a drive system for displacing said applicator assembly between first and second positions on said internal drum, and wherein said applicator assembly, which includes the system for selectively retracting and extending the collapsible shield, is configured to extend said collapsible shield as it moves from said first to said second position, and to retract said collapsible shield as it moves from said second to said first position.

6. The imaging system according to claim 2, wherein said imaging system further includes an applicator assembly for loading said imaging material into the internal drum of said imaging system, and wherein the applicator assembly, which includes the system for selectively retracting and extending the collapsible shield, displaces said collapsible shield between said extended and retracted positions.

7. The imaging system according to claim 1, wherein said collapsible shield comprises:
a collapsible enclosure; and
a frame for supporting said collapsible enclosure in said extended and retracted positions.

8. The imaging system according to claim 7, wherein said collapsible enclosure includes a pair of fan-like members.

9. The imaging system according to claim 8, wherein said frame includes a plurality of support members for supporting each of said pair of fan-like members in said extended and retracted positions.

10. The imaging system according to claim 1, wherein said collapsible shield has a bellows-like structure.

11. The imaging system according to claim 1, wherein said collapsible shield has a fan-like structure.

12. An apparatus comprising:
a imaging system for scanning an imaging material with an imaging beam; and
a retractable shield for selectively shielding the imaging beam.

13. The apparatus according to claim 12, further including:
a system for retracting and extending the retractable shield, wherein said retractable shield is in an extended position to enclose said imaging beam during scanning, and wherein said retractable shield is in a retracted position during loading of an imaging material into said imaging system.

14. The apparatus according to claim 13, wherein said retractable shield comprises:
a collapsible enclosure; and
a frame for supporting said collapsible enclosure in said extended and retracted positions.

15. The apparatus according to claim 12, wherein said imaging system includes an internal drum having an imaging surface for supporting said imaging material during scanning.

16. The apparatus according to claim 15, wherein said retractable shield remains within said internal drum during loading of said imaging material into said imaging system.

17. The apparatus according to claim 15, wherein said imaging system further includes an applicator assembly for loading said imaging material into the internal drum of said imaging system.

18. The apparatus according to claim 17, wherein said applicator assembly includes a drive system for displacing said applicator assembly between first and second positions on said internal drum, and wherein said applicator assembly, which includes a system for retracting and extending the retractable shield, is configured to extend said retractable shield as it moves from said first to said second position, and to retract said retractable shield as it moves from said second to said first position.

19. The apparatus according to claim 15, wherein said imaging system further includes an applicator assembly for loading said imaging material into the internal drum of said imaging system, and wherein the applicator assembly, which includes a system for retracting and extending the retractable shield, displaces said retractable shield between extended and retracted positions.

20. An imaging system for scanning an imaging material with an imaging beam, including:
means for selectively shielding said imaging beam; and
means for selectively positioning said shield means in extended and retracted positions;
wherein said positioning means positions said shielding means in an extended position to enclose said imaging beam during scanning of said imaging material, and wherein said positioning means positions said shielding means in a retracted position during loading of said imaging material into said imaging system.

21. A method for shielding an imaging beam in an imaging system, comprising the steps of:
extending a collapsible shield to shield said imaging beam during scanning; and
retracting said collapsible shield during loading of imaging media into said imaging system.

22. An imaging system comprising:
an internal drum for supporting recording media;
a system for scanning the recording media with an imaging beam; and
a retractable shield for selectively shielding the imaging beam.

23. The imaging system according to claim 22, further including:
a system for selectively retracting and extending the retractable shield.

24. The imaging system according to claim 23, wherein the system for selectively retracting and extending the retractable shield is configured to extend the retractable shield to enclose the imaging beam during scanning of the recording media.

25. The imaging system according to claim 22, further including a system for loading the recording media onto the internal drum.

26. The imaging system according to claim 25, wherein the loading system includes a system for selectively retracting and extending the retractable shield.

27. The imaging system according to claim 22, wherein the retractable shield comprises:
a collapsible enclosure; and
a frame for supporting the collapsible enclosure in extended and retracted positions.

28. The imaging system according to claim 27, wherein the collapsible enclosure includes a pair of fan-like members.

29. The imaging system according to claim 22, wherein the retractable shield has a bellows-like structure.

30. The imaging system according to claim 22, wherein the retractable shield has a fan-like structure.

* * * * *